Patented Mar. 3, 1942

2,274,637

UNITED STATES PATENT OFFICE 2,274,637

FLUX AND ROD FOR BRAZE WELDING

Robert M. Rooke, Jersey City, N. J., and Frederick C. Saacke, Astoria, Long Island, N. Y., assignors to Air Reduction Company, Incorporated, New York, N. Y., a corporation of New York No Drawing. Application March 5, 1940, Serial No. 322,346

7 Claims. (Cl. 219—8)

This invention relates to the art of brazing or bronze welding of either ferrous or cuprous metals and alloys, and to fluxes and non-ferrous welding rods bearing flux, for use in such operations.

Ordinary brass, or so-called bronze, welding rods give off troublesome zinc fumes when melted by the welding flame, and the resulting weld metal is more or less porous and lacking in strength by reason of the porosity.

The object of this invention is to provide a flux, and a copper-zinc alloy welding rod having associated flux, in the use of which zinc fuming is markedly reduced or practically entirely suppressed, oxidation of constituents other than zinc, for example manganese and tin, the oxides of which would weaken the weld deposit, is prevented or materially lessened, the puddle of molten metal is protected against the absorption of gases and the subsequent entrapment of the gases in the vapor phase on solidification of the molten metal, and in these and other ways the physical characteristics of the weld metal and of the bond between the weld metal and the "base" metal are vastly improved. Further objects are to increase the speed of welding, to decrease gas consumptions, and to simplify the welding procedure. Another object is to accomplish these results by the provision of a flux applicable to or with all brass or bronze welding rods instead of by adding special fume-suppressing alloying elements to the compositions of the rods themselves. This eliminates any necessity for special rods and affords, with less expensive materials, an adequate range of desirable physical characteristics in the deposited metal and in the bonds to the base metal.

We have found that a flux admirably suited for the purposes outlined, and to serve as a fume-suppressing coating for copper-zinc alloy welding rods, is one which by proximate analysis is comprised predominantly of $B_2O_3$ and $SiO_2$, and in which the amount of $B_2O_3$ is at least 70% of the sum of $B_2O_3$ and $SiO_2$. Fluxes of this invention contain of the sum of these constituents 70%–98% of $B_2O_3$ and 2%–30% of $SiO_2$.

A minor amount of one or more metallic oxides or oxide-yielding ingredients may be and preferably is included, for example, the oxides of sodium, potassium, copper, iron, chromium and nickel. On the basis of oxides the metallic oxide content of the flux may be 0.4%–30% of the total of $B_2O_3$, $SiO_2$ and metallic oxide. According to a practical and advantageous mode of compounding the flux, sodium silicate is employed as a source of $SiO_2$ and metallic oxide, boric acid is employed as a source of $B_2O_3$, and borax is employed as a source of $B_2O_3$ and metallic oxide.

The properties of the flux are improved by the addition of borax. This is not merely a secondary source of $B_2O_3$ and metallic oxide, but has a specific function in the combination. After aging or on excessive heating during the brazing or bronze welding operation, the molten flux without borax is not completely uniform and may interfere with the progressive movement of the welding puddle. With borax, the flux melts to a more uniform liquid, which is readily floated by the advancing puddle of molten brass and which better protects the deposited and base metals without interfering with the bonding of the two. Borax may supply up to 40% of the $B_2O_3$. A borax to boric acid ratio of 1 to 5 is advantageous.

The addition of a small amount of potassium or sodium chromate or dichromate has some effect in making the flux glass more readily removable from the work, and provides a distinctive color to a flux coated rod that obscures color changes on exposure and aging.

The flux is preferably made up with water to form a paste or suspension, into which the end of the copper-zinc alloy welding rod can be dipped from time to time during the brazing or welding operation, or with which the rod can be coated by the user before use, or by the manufacturer of the rod.

The compounds $B_2O_3$ and $SiO_2$ can be incorporated as such into the flux, but it is more desirable to use $B_2O_3$ in the form of boric acid and borax and $SiO_2$ in the form of sodium silicate or water glass.

The following is given as a specific example of compositions that have been employed successfully:

| | Percent |
|---|---|
| Boric acid | 32.5 |
| Borax | 6.0 |
| Water glass, 40° Bé | 5.0 |
| Potassium dichromate | 1.0 |
| Water | 55.5 |

Copper-zinc alloy welding rods that would otherwise have pronounced fuming characteristics are coated with the flux, and when used with the oxyacetylene or like flame for brazing or bronze welding are substantially fumeless and give sound, non-porous welds. If the flux is made up with water the rods are easily coated by dipping and may be used at once.

Preferably, however, the rods are pre-coated and the flux allowed to dry on the rods. In order to make the flux coating more resistant to handling and shipment, suitable binders may be employed, like collodion, latex and waxes such as carnauba and beeswax. Deposition of a nitrocellulose skin on the flux coating affords excellent protection to the dried coating and permits the coated rod to be bent and handled freely without excessive damage to the coating.

We claim:

1. A flux for braze or bronze welding, which by proximate analysis is comprised predominantly of $B_2O_3$ and $SiO_2$ and contains of the sum of these ingredients 70%–98% $B_2O_3$ and 2%–30% $SiO_2$.

2. A flux as set forth in claim 1, which contains boric acid and sodium silicate.

3. A flux for brazing or bronze welding, which by proximate analysis is comprised predominantly of $B_2O_3$ and $SiO_2$ and contains of the sum of these ingredients 70%–98% $B_2O_3$ and 2%–30% $SiO_2$, the $B_2O_3$ content of the flux being mostly in the form of boric acid and a minor part in the form of borax.

4. A flux as set forth in claim 1, which contains a small amount of an alkali metal chromate.

5. A flux as set forth in claim 1, which contains a small amount of potassium dichromate.

6. A copper-zinc alloy welding rod having associated therewith a flux which by proximate analysis is comprised predominantly of $B_2O_3$ and $SiO_2$ and contains of the sum of these ingredients 70%–98% $B_2O_3$ and 2%–30% $SiO_2$.

7. A copper-zinc alloy welding rod having associated therewith a flux which by proximate analysis is comprised predominantly of $B_2O_3$ and $SiO_2$ and contains of the sum of these ingredients 70%–98% $B_2O_3$ and 2%–30% $SiO_2$, the $SiO_2$ being in the form of sodium silicate, and at least the major part of the $B_2O_3$ being in the form of boric acid.

ROBERT M. ROOKE.
FREDERICK C. SAACKE.